(12) United States Patent
Avila et al.

(10) Patent No.: US 8,583,430 B2
(45) Date of Patent: Nov. 12, 2013

(54) SEMI-AUTOMATED INTERMODAL VOICE TO DATA TRANSCRIPTION METHOD AND APPARATUS

(76) Inventors: J. Albert Avila, Longboat Key, FL (US); Lev Elbert, Sarasota, FL (US); Andy Estes, Sarasota, FL (US); Mark Famiglio, Sarasota, FL (US); Brian Johnson, Bradenton, FL (US); Jason Sackett, Columbia, MD (US); Russ Saul, Bradenton, FL (US); Norman Worthington, Sarasota, FL (US); Baird Juckett, Baltimore, MD (US); Rob Lincoln, Sarasota, FL (US); Don Ruth, Sarasota, FL (US); Michael Stipe, Athens, GA (US)

( * ) Notice: Subject to any disclaimer, the term of this patent is extended or adjusted under 35 U.S.C. 154(b) by 267 days.

(21) Appl. No.: 10/236,683

(22) Filed: Sep. 6, 2002

(65) Prior Publication Data
US 2003/0125950 A1    Jul. 3, 2003

Related U.S. Application Data

(60) Provisional application No. 60/317,832, filed on Sep. 6, 2001.

(51) Int. Cl.
*G10L 15/26*    (2006.01)
*G10L 21/00*    (2013.01)

(52) U.S. Cl.
USPC ........................................ 704/235; 704/270.1

(58) Field of Classification Search
USPC ................................ 704/235, 270, 260, 270.1
See application file for complete search history.

(56) References Cited

U.S. PATENT DOCUMENTS

| | | | |
|---|---|---|---|
| 3,648,249 A * | 3/1972 | Goldsberry | 345/156 |
| 5,003,574 A * | 3/1991 | Denq et al. | 379/75 |
| 5,146,439 A * | 9/1992 | Jachmann et al. | 369/25.01 |
| 5,875,436 A * | 2/1999 | Kikinis | 705/34 |
| 6,442,589 B1 * | 8/2002 | Takahashi et al. | 709/203 |
| 6,757,362 B1 * | 6/2004 | Cooper et al. | 379/88.01 |
| 6,813,603 B1 * | 11/2004 | Groner et al. | 704/235 |
| 6,834,264 B2 * | 12/2004 | Lucas et al. | 704/235 |
| 6,973,434 B2 * | 12/2005 | Miller | 705/2 |
| 2003/0126216 A1 * | 7/2003 | Avila et al. | 709/206 |
| 2005/0102146 A1 * | 5/2005 | Lucas et al. | 704/270 |

* cited by examiner

*Primary Examiner* — Angela A Armstrong
(74) *Attorney, Agent, or Firm* — Robert B. Famiglio; Famiglio & Associates

(57) ABSTRACT

A semi-automated, intermodal transcription-formatted data input system utilizing one or more interconnected servers which receive communications links. The system identifies and validates a user, and receives, accepts and sends voice files to a distributed processing location where operators are assigned transcription tasks. The voice input from the user is transcribed according to a predefined format for that user which takes voice input information provided and transcribes it into user-defined data fields for retransmission to that user over a preferred communications system. A user may dictate predefined formatted information such as appointments, objective checklists such as a to-do list, contact information or other predefined data formats for processing and retransmission to the same user or other defined users for entry in an operating system or application desired by that user. Retransmission may be over conventional voice lines, internet or wireless internet or wireless data devices such as disclosed in the preferred embodiment.

3 Claims, 2 Drawing Sheets

SEMI-AUTOMATED INTERMODAL VOICE TO DATA TRANSCRIPTION METHOD AND APPARATUS

CROSS REFERENCES TO RELATED APPLICATIONS

This application claims the benefit of the applicant's provisional application, serial No. 60/317,832 which was filed Sep. 6, 2001.

BACKGROUND OF THE INVENTION

1. Field of the Invention

The present invention relates to the field of remote transcription and information processing. More particularly the disclosed invention provides both a system and a method for providing dictation and transcription services particularly aimed at providing intermodal data conversion services. The invention provides both apparatus, and a method for gathering dictation from individual users which access the system through the telephone network, and provide dictation containing specific styles and types of data input for conversion into a preferred output format, defined in advance by the user, for return to that user with automatic entry into their data processing devices of choice.

Business in today's society relies heavily upon information management devices, largely software driven, and mostly portable in nature. Such information management devices span from desktop computers, intelligent cellular phones, paging devices and most notably palm top computers or a personal digital assistant (PDA). Presently, a popular PDA is a hand-held device, now with integrated wireless Internet access, which utilizes the PALM® operating system such as with a PALM PILOT®, HANDSPRING®, SONY CLEO®, and other devices presently available or under development. Many users of these devices carry them specifically to capture ideas, information, or other fragments of data which are useful or necessary for their daily productivity but which normally require manual input into a given device.

In the past, such input has largely been by downloading from a larger machine which synchronizes or mates with the PDA or palm top computer. Further, such devices allow for input by stylus, touch screen input or portable keyboard which must be carried along with the device if a substantial amount of information must be entered. A new input paradigm is needed to provide a faster, more effortless and more natural input of data into such portable devices.

Many users of such portable computers and PDAs are comfortable with dictation or the use of verbal instructions to provide ideas and information. Further, when people travel, the tools that they have at home or in the office are usually not available but telephones for simple voice communications are now ubiquitous. Between the universal access to conventional land line telephones and the now popular mobile or cellular phone, access to the telephone voice network is frequently not a problem.

In the present invention, a user will have a predefined profile for that user, providing for one or more formats preferred by the user for their personal digital assistant or other palm top or miniature computer system of choice. Many personal information managers, (PIM) use predefined formats for data entry. Such devices normally have general functions known as contacts, calendars, to-do's, and memos in addition to messaging or e-mail. Entering data by hand using a stylus or portable typewriter keyboard accessary is normally just not practical, particularly in the case where the user is driving a car, walking through an airport or otherwise underway and not in a position to conveniently take the time to "tap in" desired data, letter by letter. Sometimes it is simply impractical to do it at all.

The present invention allows the user to call a preselected toll-free number, have his identification verified and his user profile automatically accessed. The user can dictate in free form the type of information he desires to be entered on his PDA so that a word processing operator will enter the information desired by the user in the correct format, and retransmit it back to that user for automatic entry into his PDA in the desired format, whether it is one or more items to be listed on his to-do list, a calendared event, or simply contact information to be listed in his PIM. The system also allows the dictation of e-mail to be sent to another party, while first providing a retransmission of that e-mail to the user so that he may verify the text, make minor changes in the text if desired, and approve the message for transmission over the internet to the recipient.

2. Objects of the Invention

Accordingly, it is the object of the present invention to provide a method and apparatus for transmission, transcription, intermodal conversion of pertinent data from the transcription into user predefined formats, and redelivery to that user for entry into a Personal Digital Assistant or other devices for automatic entry into the user's device. It is a further object of the invention to provide such services and intermodal transcription conversion through wireless means for delivery to the user by wireless internet services or data pager information services.

It is a further object of the present invention to provide a method and a system for delivery of messages or data in accordance with a message delivery profile of the user indicating which message delivery system or format should be used and in what order transcription instructions should be processed.

It is a further object of the present invention to provide a method and a system for delivery of messages or data in accordance with a message delivery profile of a user in which speech instructions from the user are transcribed into information or data fields in accordance with that user's profile and wherein such data or information is stored at a remote data storage location for archiving or for redelivery to one or more users at a later time.

SUMMARY OF THE INVENTION

In the preferred embodiment, a transcription to data conversion system is provided which comprises a first communications link for a user to transmit substantially voice-based information to be transcribed. A transcription computer server is used to record the dictation of the user which can be accessed by one or more transcription technicians at one or more locations. The system provides a recognition of a particular user such that data transcription formats are delivered to the transcription technician allowing for dictation instructions for information to be entered to be transcribed into the user-defined format for redelivery to a user's portable digital assistant or other information management device.

After the system forwards the user dictation along with the user profile to the transcription technician on a second communications link, the technician transcribes the user dictated information into the predefined fields made available to that technician by the system along with instructions as to the user format preferred. The technician transcribes the contact information, calendering information, to-do items or memos and e-mails into the field required by the user's predefined personal information device or personal digital assistant. The user's predefined personal information format includes the correct parsing of information to be compatible with the user's digital device. The digital device being used by a particular user has predefined application field formats which can be entered electronically after the voice instruction provided by the user are interpreted and reduced to specific information which apply to specific fields for the user's information management device. When completed, the transcription technician transmits the information back to the user over a third communications link for entry into the user's device preferably by wireless means. Such wireless means in the preferred embodiment include wireless internet access so that the user can receive the transcribed data for loading into his device regardless of the location of the user, as long as wireless internet or other wireless data transmission facilities are available to the user at the time he wishes to download the transcribed data. In the event direct internet connections are available to a user at a fixed location, such data delivery is also available over a non-wireless connection.

DETAILED DESCRIPTION OF THE INVENTION

Figure 1:
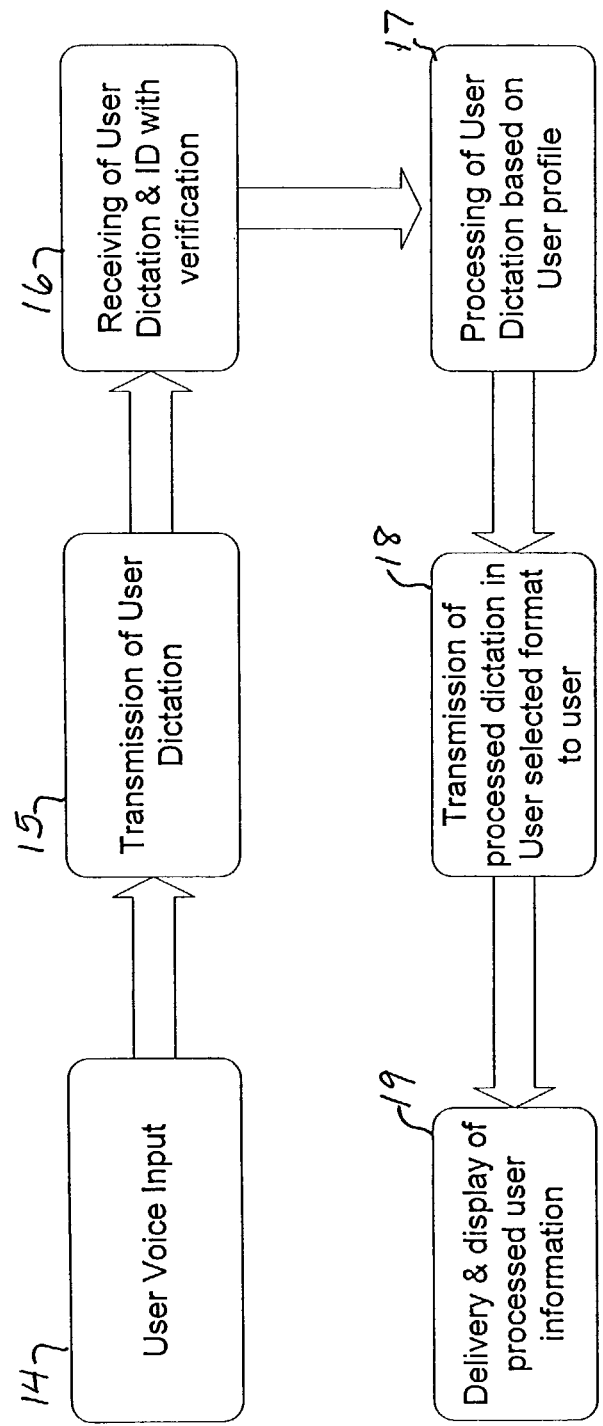
FIG. 1 is a block diagram illustrating the major functional aspects of the system disclosed.

The invention will now be described in reference to the various figures, wherein like numerals represent like parts. Turning to FIG. 1, in its simplest form the disclosed invention is illustrated in a block diagram showing the various stages of processing in order to carry out the invention. Voice input begins at stage 14 where a user uses a communication device to dictate instructions transmitted over medium 15 to a central receiving point 16. Medium 15 may be land-lined or cellular phone or any type of conventional voice communications voice media to transmit the voice input 14 to a centralized receiving location 16. After the information about the user is verified, the information is processed at 17 for redelivery to the user. The processed data, which is converted, is transmitted through medium 18 back to the user to be displayed or conveyed to the user in a predefined format 19. The user is identified by a user name or identification code which allows the transcription operator to call up the preferred data field format at the centralized receiving location 16. Therefore, the speech transcription operator will be able to access information regarding the user preferences and process the user's speech instructions to transcribe information and data into the correct data field formats that apply to the user's devices which apply to the given user preferred format. Further, it is also possible to add a storage step to the transmission of processed dictation as shown in the step at 18 on FIG. 1. After the processing of user dictation at 17, the formatted user data and information can be forwarded to the user in the transmission at 18 as well as simultaneously sent to a storage location, either onsite or at a remote location to allow the user or the user's enterprise to access such information later in time for other purposes.

Figure 2:
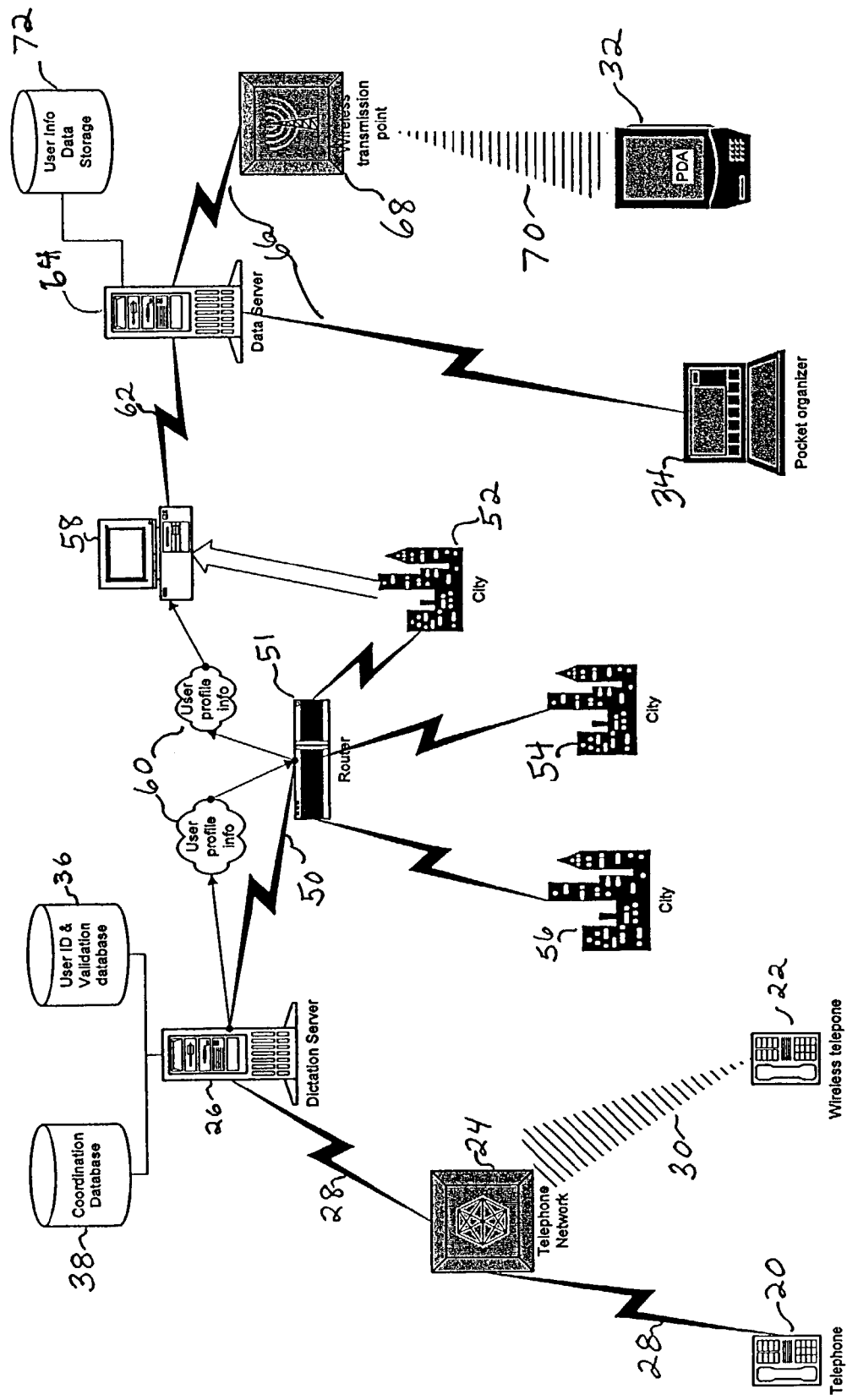
FIG. 2 is a system pictorial diagram illustrating the transcription to data delivery system disclosed as the present invention.

Turning to FIG. 2, details of the system in the preferred embodiment shall be described. First, a user may access the system by either choosing to dictate over a land line telephone 20 or a wireless telephone 22. In either case, the universal telephone network 24 is accessed for transmission of the voice dictation to dictation server 26. In the case of land line telephone 20, twisted pair or other conventional land line equipment is used for link 28 to telephone network 24. With a wireless telephone 22, radio communications link 30 is used to introduce the dictation into the telephone network 24. The telephone network 24 is linked to server 26 through link 28. Link 28 is a conventional telephone circuit which uses telephone switching to access a central location where dictation server 26 can provide certain initial decisions as to how the user dictation will be processed.

Server 26 has various data bases available to it to make initial decisions for the processing of the dictation arriving through link 28. First, there is a validation data base 36 which validates callers before taking dictation. Validation is accomplished through Caller-ID if available and pre-installed in the validation database 36. Absent Caller-ID availability, simple dual tone multiple frequency (DTMF) based personal identification numbers (PIN) may be used and can simply be user-selectable. Caller validation provides a certain level of security to assure that the user is in fact the subscriber eligible to access the system provided in the present invention. If desired, user validation can use voice printing and voice recognition technology to compare a prearranged phrase spoken by the user to assure that the user is who the user claims to be in accessing the system.

Once the validation of the caller has been accomplished, dictation server 26 accepts conventional dictation and instructions from the user and records such dictation in a conventional voice-recording digital format, such formats being well known to those skilled in the art. After the user has finished dictating their instructions and information, dictation server 26 must make certain decisions as to which decentralized transcription location to send the user's dictation to be transcribed. Dictation server 26 has a coordination database 38 which is updated to make available to server 26 information concerning the best routing for processing of the work.

It can be appreciated that the dictation can be sent through communications link 50 to various locations, such as transcription location 52, 54 or 56, though there may be many more locations depending on size of the system. By having the availability of the coordinating database 38, the transcription of the user's input can be accomplished by a substantially decentralized network of transcription operators or technicians. By having a decentralized network of transcribers available, a large number of transcription operators may be employed who need not be tied to a particular location and may work at home or from small offices in widely separated areas where costs may be substantially lower. Dictation server 26, being driven by coordinating database 38, decides which location to send a particular user's work to be transcribed and redelivered.

In FIG. 2, first transcription location 52 is used to illustrate the processing of the user's data although it can be appreciated that location 54 and 56 can operate in an identical fashion as the processing occurring at transcription location 52. A transcription operator uses a transcription processor 58 to which dictation server 26 forwards the voice files of the user along with a user profile which includes instructions as to the preferred transcription method of the user and the type of data entry fields the user's PDA 32 or Pocket Organizer 34 utilizes. The transcription operator parses the speech instructions and information received by the users into predefined data field formats to be delivered to that user as shown. Though for illustration purposes portable information management devices are shown, it could be appreciated that such information could also be loaded into desktop systems or other types of information management systems such as Microsoft Outlook or other computer applications which provide definable data input fields for conversion of dictated instructions into data entry fields.

Returning to transcription processor 58, the transcription operator at processor 58 is provided with access to the digital voice transcription files communicated by the server 26, as well as the user profile database 60 which is forwarded to transcription processor 58. User profile database 60 may be contained in transcription server 26, and the particular user's preference files may be sent to transcription processor 58 along with the dictation files for processing. The operator transcribing instructions at processor 58 reviews the user's voice dictation in a conventional fashion, and enters the data requested on the user profile fields presented to the operator utilizing processor 58. In one case, by way of example, the user may be using a PDA which uses the PALM® operating system. The user may dictate a request that several to-do items be entered onto his list, several schedules be entered on his calendar and a number of contacts be entered based on a recent meeting or a business card he may have available as he dictates the instructions initially. The operator of processor 58 will enter such information and transmit such information through link 62 to data server 64. Link 62 can be a telephone line, an internet connection or a local area network if data server 64 is co-located with processor 58. Data server 64 then conveys the data to be automatically loaded in the user's selected information management system through link 66 which is frequently a wireless internet service selected by the user to receive the data to be automatically entered in the users information management device.

The above disclosure of the invention includes the basic framework describing the operation of the system in its simplest terms. In each of the processing steps described and illustrated in FIG. 2, it is possible to add additional function to one or more stages. Such additional improvements add to and improve the efficiency of the system. For example, in considering the transmission of user voice files generated from dictation, which was originally delivered to dictation server 26, by using data compression techniques in transmission of the user voice dictation of the transcription location 52, 54 or 56 would reduce transmission time by decreasing the overall file size of voice data files being delivered for transcription. Further, the user ID and validation database 36 can be used to provide billing information in that the users of the system could be charged for the services provided based on the user profile and invoicing plan prearranged with that user. In similar fashion, those users who may have not complied with the user requirements for a particular billing plan can be intercepted and denied access to the system in that the user billing information could coexist with the user ID and validation database.

The present invention also provides for a means to expand the type of user input which may be transcribed or converted to data formats which are expanded from the normal formats one would expect to see in a personal information management application or any PDA. For example, users of the present invention may desire transcription of information for any physical fitness program in which they are tracking their progress, sales reporting for those mobile sales personnel who have relatively standard reporting formats, or even accident reporting for professional drivers or individuals constantly traveling, field accidents observed by foremen or other damage reports that might be used, for example, by insurance adjusters constantly reporting information into a standardized company format as may be required by a given carrier.

It will be appreciated by those skilled in the art that the present system would provide for automatic reporting notification by delivery of e-mail messaging to predefined locations upon the entry of particular information and upon the request of the user accessing the system and providing such information. By way of example only, a field insurance adjuster inspecting an insured lost at a particular location may access the system by his pocket cellular telephone, dictate information real time into his account in accordance with the above described invention, and request that the report be electronically forwarded in the proper format to his home office, as well as his field office and perhaps to his laptop computer or PDA. In this fashion, the user would know in advance that the delivery information has been entered in accordance with the requirements of his profile and verified to his satisfaction. The disclosed method of speech and speech information transcription is ideally suited for conversion into designated and defined form fields used for reporting information such as an insurance loss. The information can be redelivered to the insurance adjuster used in the example, preformatted into the correct form for delivery to the user in the field.

One useful variation of the present invention includes the addition of longer term storage of the user information which is transcribed for retransmission to that user. Returning to FIG. 2, user information data storage 72 can be used to maintain the transcribed data for the user as it is sent to the user for use in the user's portable digital device. It can be appreciated that data storage 72 can be located on data server 64 or be comprised of a remote data backup system within an enterprise or a remote site to allow the user to store the data information fields transcribed for that user. Within a given enterprise, using the system shown in FIG. 2 within a wide area network, enterprise backup storage and data retrieval can be accomplished by recording the transcribed data field information on such long term storage as represented by storage 72 in FIG. 2.

It will also be appreciated by those skilled in the art that the system so described with the present invention may be used entirely within one enterprise without the need for remote access across public communication systems or wireless access and transmission. For example, an enterprise may wish to provide its employees, users in the present system, means to access a central data transcription pool within the enterprise which accepts instructions via telephone or perhaps radio. The transcription takes place in a similar fashion as disclosed in FIG. 2 but wholly within the boundaries of the enterprise network. Employees within an enterprise may dictate instructions by a telephone intercom within the enterprise to a central pool transcription location, thereby having their calendar information, customer information, to-do lists and other messages transcribed and redelivered to the employee in a preferred field format, and/or stored in the enterprise data storage server for access by other members of the enterprise or delivery to a master calendar, customer list or the like.

It can be appreciated from the foregoing description and the various embodiments provided that numerous changes or modifications may be made without departing from the spirit or the scope of the invention as intended. Although certain preferred embodiments are presented for the purpose of describing the application of the present invention which are shown to satisfactorily operate, other such species or derivations from the thrust of the invention presented are considered within the scope of the invention.

What is claimed is:

1. A transcription to data delivery system comprising:
a transcription server for receiving and processing voice information to be transcribed, said server also containing user specific profile information including user personal information requirements whereby said personal information requirements are comprised of specific data fields required for the user's personal digital assistant for calendar, phonebook and to-do information entry;

communication apparatus connected to the transcription server for receiving communication from users, the communication apparatus adapted for receiving user voice information;

wherein, over the communication apparatus, the transcription server receives from a user substantially voice-based information to be transcribed, selects and alerts a transcription technician from preprogrammed selection criteria, sends the substantially voice-based information to the transcription technician, said voice-based information including user instructions to transcription technician as to entry of information into parsed user preferred format fields in accordance with said specific data fields required for the user's personal digital assistant for calendar, phonebook and to-do information entry;

thereafter a transcribed version of the substantially voice-based information from the transcription technician is parsed into user predefined data field formats specifically required for direct entry into said user's information device by delivery to the user in the specific format required by the user's personal information device;

wherein the parsed predefined format is communicated automatically to the user's personal information device for direct entry into said device;

wherein multiple locations are incorporated to accept the output from the said transcription server based on preprogrammed selection criteria;

wherein said selection criteria is related to the data field format preassigned to the user and corresponds to the user's specific personal information device requirements for data entry;

wherein further the information forwarded by said transcription server is accompanied by the user specific profile information including user personal information requirements defining the specific data fields required for the user's personal digital assistant for calendar, phonebook and to-do information entry.

2. A method of delivering information from voice to preformatted data transcribed to be automatically entered into a user's data organizing system in the user's personal digital assistant comprised of the steps of:

Storing information regarding a user's desired data delivery format wherein said data delivery format is comprised of specific data fields required for the user's personal digital assistant for calendar, phonebook and to-do information entry;

storing information regarding said user's identity and security information;

receiving voice instructions over a telecommunications system from said user as to desired input related to said desired data delivery format;

wherein said voice instructions provide information regarding what part of said voice information shall relate to the user's desired data delivery format;

comparing said user's identity with said stored information to determine required transcription format for said user corresponding to the user's desired data delivery format;

transcribing said voice instructions in accordance with said information about the required transcription format for said user; and transmitting said formatted information to said user to be automatically delivered into said user's data organizing system;

wherein said user's desired data delivery format includes to-do lists;

wherein said user's desired data delivery format further includes calendar entry information;

wherein said defined user data format further includes address book entry information; and wherein the said specific data fields required for the user's personal digital assistant for calendar, phonebook and to-do information entry are populated into the corresponding field using the user's desired data delivery format.

3. A method of voice to data information conversion and delivery for transcribing voice instructions into data fields suitable for direct entry into a user's personal digital assistant including the steps of:

assignment of identification criteria to a user to relate to the data field requirements of that user's personal digital assistant and to associate said user with the data field requirements of the user's personal digital assistant, wherein said data field requirements are comprised of specific data fields required for the user's personal digital assistant for calendar, phonebook and to-do information entry;

storing the data field requirements of that user's personal digital assistant to allow for direct entry of transcribed voice information without intervention by the user;

providing user voice information by telephone to a transcription server to record the voice information;

said voice information including user information parsed by the user to relate to user's data fields;

forwarding said voice information associated with the said user's data field requirements to a remote location for transcribing;

transcribing the said voice information by parsing said information into said data fields specifically required by the user's personal digital assistant data field requirement; and returning the parsed data by communications means to the user's personal digital assistant for direct entry into the data field required by the user's personal digital assistant;

wherein said data field requirement of the user's personal digital assistant is a to-do list;

said data field requirement of the user's personal digital assistant is a telephone contact list;

and wherein further said data field requirement of the user's personal digital assistant is comprised of data for a calendar entry; and wherein said data fields required for the user's personal digital assistant for calendar, phonebook and to-do information entry are automatically populated into the predefined field for each of the to-do, telephone contact and calendar entry information.

* * * * *